(12) United States Patent
Chen et al.

(10) Patent No.: US 11,169,289 B2
(45) Date of Patent: Nov. 9, 2021

(54) SENSING-ACQUISITION-WIRELESS TRANSMISSION INTEGRATED MICROSEISMIC MONITORING SYSTEM AND METHOD

(71) Applicants: Institute of Rock and Soil Mechanics, Chinese Academy of Sciences, Hubei (CN); Hubei Seaquake Technology Co., Ltd, Hubei (CN)

(72) Inventors: Bingrui Chen, Hubei (CN); Xinhao Zhu, Hubei (CN); Huafang Li, Hubei (CN); Qiqing Fu, Hubei (CN)

(73) Assignees: Institute of Rock and Soil Mechanics, Chinese Academy of Sciences, Wuhan (CN); Hubei Seaquake Technology Co., Ltd., Wuhan (CN)

( * ) Notice: Subject to any disclaimer, the term of this patent is extended or adjusted under 35 U.S.C. 154(b) by 106 days.

(21) Appl. No.: 16/666,370

(22) Filed: Oct. 28, 2019

(65) Prior Publication Data

US 2020/0284934 A1 Sep. 10, 2020

(30) Foreign Application Priority Data

Mar. 7, 2019 (CN) .......................... 201910172760.3

(51) Int. Cl.
*G01V 1/28* (2006.01)
*G01V 1/30* (2006.01)
(Continued)

(52) U.S. Cl.
CPC .............. *G01V 1/288* (2013.01); *E21B 47/12* (2013.01); *G01V 1/18* (2013.01); *G01V 1/30* (2013.01);
(Continued)

(58) Field of Classification Search
CPC . G01V 1/288; G01V 1/30; G01V 1/48; G01V 1/18; G01V 2210/1299;
(Continued)

(56) References Cited

U.S. PATENT DOCUMENTS

| 8,024,980 B2 * | 9/2011 | Arms | G01L 5/0004 73/763 |
| 8,384,583 B2 * | 2/2013 | Leva | G01S 13/9023 342/25 C |

(Continued)

FOREIGN PATENT DOCUMENTS

| CN | 2687693 Y | * | 3/2005 |
| CN | 104062677 A | | 9/2014 |

(Continued)

*Primary Examiner* — Daniel R Miller
*Assistant Examiner* — Christian T Bryant
(74) *Attorney, Agent, or Firm* — Wayne IP LLC

(57) ABSTRACT

The present invention discloses a sensing-acquisition-wireless transmission integrated microseismic monitoring system, comprising a sensing unit, wherein the system further comprises an acquisition-wireless transmission unit. The acquisition-wireless transmission unit comprises a flameproof enclosure, an acquisition instrument, a battery, a wireless transmitter and a transmitting antenna. A push nut is arranged at an open end of the flameproof enclosure. A support stage is sheathed on an outer wall of the flameproof enclosure. A connection ring is movably sheathed on the open end of the flameproof enclosure. The push nut is connected to the connection ring. Multiple inner wing elastic plates are circumferentially arranged on the connection ring. The inner wing elastic plates are connected to corresponding expandable plate outer wings, respectively. The present invention further discloses a sensing-acquisition-wireless transmission integrated microseismic monitoring method.

4 Claims, 7 Drawing Sheets

(51) Int. Cl.
*E21B 47/12* (2012.01)
*G01V 1/48* (2006.01)
*G01V 1/18* (2006.01)
*G01V 1/22* (2006.01)
*E21B 49/00* (2006.01)
*G01V 1/52* (2006.01)
*G01V 1/16* (2006.01)
*G01V 1/42* (2006.01)
*G01V 1/24* (2006.01)
*E21B 47/00* (2012.01)

(52) U.S. Cl.
CPC .............. *G01V 1/48* (2013.01); *E21B 47/00* (2013.01); *E21B 49/006* (2013.01); *G01V 1/16* (2013.01); *G01V 1/22* (2013.01); *G01V 1/223* (2013.01); *G01V 1/24* (2013.01); *G01V 1/28* (2013.01); *G01V 1/42* (2013.01); *G01V 1/52* (2013.01); *G01V 2001/526* (2013.01); *G01V 2210/123* (2013.01); *G01V 2210/1299* (2013.01); *G01V 2210/1429* (2013.01); *G01V 2210/65* (2013.01)

(58) Field of Classification Search
CPC ....... G01V 2210/1429; G01V 2210/65; G01V 2210/123; G01V 1/223; G01V 2001/526; G01V 1/52; G01V 1/42; G01V 1/22; G01V 1/28; G01V 1/16; G01V 1/24; E21B 47/12; E21B 47/00
See application file for complete search history.

(56) References Cited

U.S. PATENT DOCUMENTS

| | | | |
|---|---|---|---|
| 2017/0022806 A1* | 1/2017 | Ounadjela | E21B 43/26 |
| 2017/0068006 A1* | 3/2017 | Forgues | G01V 1/223 |

FOREIGN PATENT DOCUMENTS

| | | |
|---|---|---|
| CN | 105717537 A | 6/2016 |
| CN | 205404828 U | 7/2016 |
| CN | 106125129 A | 11/2016 |
| CN | 109254319 A | 1/2019 |
| WO | 2015153537 A1 | 10/2015 |

* cited by examiner

SENSING-ACQUISITION-WIRELESS TRANSMISSION INTEGRATED MICROSEISMIC MONITORING SYSTEM AND METHOD

CROSS-REFERENCE TO RELATED APPLICATIONS

This application claims the benefit of priority from Chinese Patent Application No. CN201910172760.3, filed on Mar. 7, 2019. The content of the aforementioned application, including any intervening amendments thereto, is incorporated herein by reference in its entirety.

TECHNICAL FIELD

The present invention relates to the field of microseismic monitoring, and in particular to a sensing, acquisition and wireless transmission integrated microseismic system and a sensing, acquisition and wireless transmission integrated microseismic method, which are applied to fields such as on-site microseismic monitoring and tests.

BACKGROUND OF THE PRESENT INVENTION

The microseismic monitoring technology is one of important means for the monitoring, prevention and control of rock engineering disasters. At present, the signal sensing, acquisition and transmission apparatuses in the microseismic monitoring technology are substantially separated. The transmission between a sensor and an acquisition instrument is realized by an electrical cable, and the transmission between the acquisition instrument and a signal receiving server is also mainly realized in a wired manner (an optical cable or an electrical cable).

Disasters such as rockburst in the rock engineering often occur near the excavation (or mining) surface or within a disturbance range thereof. For example, the rockburst in the deep-buried tunnels mainly occur within 30 m behind the tunnel face. This region is not only a construction region with intensive excavation and support, but also within the range with flying stones caused by blasting excavation. In the conventional wired microseismic monitoring technologies, it is difficult to realize monitoring in this region, and sensors can be arranged only outside the range with flying stones caused by blasting excavation (or mining). Therefore, the rock fracture (particularly small-size rock fracture) microseismic information during the rockburst development process near the tunnel face will be lost seriously; it will have a negative impact on the monitoring and early warning of rockburst.

Additionally, in a tunnel constructed by TBM, due to the structural limitation of the TBM itself, sensors can be mounted only in the upper half portion of the tunnel when the conventional wired microseismic monitoring technology is used. As a result, the geometric shape of the sensor array is almost planar and the positioning of microseismic sources is thus influenced. In a tunnel excavated by drilling and blasting, when the conventional wired microseismic monitoring technology is used, sensors are generally arranged on two sides of the tunnel, and the acquisition instrument is fixed on one side. In this case, data transmission lines of the sensors on the other side can reach the acquisition instrument only by running through the vault. To run through the vault, the data transmission lines need to be fixed by delivering lines by cranes and drilling the wall of the tunnel by drill jumbos. Consequently, the workload is greatly increased. Furthermore, running the signal transmission lines through the vault greatly increases the probability of damaging the signal transmission lines by apparatuses such as the on-site locomotives. Thus, the continuity of acquisition of microseismic signals is influenced, and the monitoring and early warning of disasters is influenced.

The use of wireless transmission technologies can solve the above problems. However, there are new technical challenges. For example, in the conventional wired microseismic monitoring technologies, the sensor is fixed on the bottom of the borehole, signals are transmitted to an external acquisition instrument through data transmission lines, and the acquisition instrument is powered by a routine 220V AC power supply. In contrast, if the wireless microseismic monitoring technologies are used, the sensor, the acquisition instrument and the wireless transmitter need to be fixed in a same apparatus and powered by the carried batteries. If data is received and transmitted continuously (by wireless transmission), the working cycle of the acquisition instrument will be greatly shortened, and it is necessary to frequently disassemble the apparatus to charge the batteries. This will influence the monitoring effect and the construction efficiency. Additionally, due to the integration of the sensor, the acquisition instrument, the wireless transmitter and the battery, both the diameter and the weight of the apparatus are greater than those of the sensor. Since the apparatus is mounted on the tunnel portal (unlike the mounting of the sensor on the tunnel bottom), new requirements are proposed for the fixation of the apparatus on the tunnel wall. The above problems cannot be solved by the existing technologies. Therefore, the present invention provides a sensing-acquisition-wireless transmission integrated microseismic monitoring system, which is of great significance and great promising application prospect.

SUMMARY OF THE PRESENT INVENTION

In view of the deficiencies in the prior art, the present invention provides a sensing-acquisition-wireless transmission integrated microseismic monitoring system. The present invention also provides a sensing-acquisition-wireless transmission integrated microseismic monitoring method.

The present invention will be described below.

A sensing-acquisition-wireless transmission integrated microseismic monitoring system is provided, including a sensing unit, wherein the system further includes an acquisition-wireless transmission unit;

the sensing unit includes a microseismic sensor which is arranged on the bottom of a borehole formed on an inner wall of a tunnel;

the acquisition-wireless transmission unit includes a flameproof enclosure, an acquisition instrument, a battery, a wireless transmitter and a transmitting antenna, the battery being connected to the acquisition instrument and the wireless transmitter, respectively;

the acquisition instrument, the battery and the wireless transmitter are all arranged in the flameproof enclosure;

the flameproof enclosure is a cylindrical barrel arranged at an orifice of the borehole; an end of the flameproof enclosure facing the bottom of the borehole is a closed end and provided with a flameproof cable gland, while an end of the flameproof enclosure facing the tunnel is an open end; a seal cover is hermetically arranged at the open end; a flameproof cable gland is arranged on the seal cover; the acquisition instrument is connected to an end of a data transmission line through the flameproof cable gland arranged at the closed end of the flameproof enclosure, while the other end of the data transmission line is connected to the microseismic sensor; and the wireless transmitter is connected to the transmitting antenna through the flameproof cable gland arranged on the seal cover; and open end external threads are formed at the open end of the flameproof enclosure; a push nut is sheathed on the open end external threads through threads; a support stage is sheathed on a portion of the outer wall of the flameproof enclosure between the open end external threads and the closed end; a connection ring is movably sheathed on the open end of the flameproof enclosure; the push nut is connected to the connection ring; a plurality of inner wing elastic plates are circumferentially arranged on the connection ring; the inner wing elastic plates are connected to corresponding expandable plate outer rings, respectively; friction teeth are provided on outer sides of the expandable plate outer wings; and the diameter of a circle containing a joint of each inner wing elastic plate with the connection ring is smaller than the outer diameter of the support stage.

Open end internal threads are formed at the open end of the flameproof enclosure described above, and external threads matched with the open end internal threads of the flameproof enclosure are formed on the seal cover.

The support stage described above is overall annular, and the support stage has a triangular cross-section.

Ribs are arranged on the inner wall of the flameproof enclosure described above, the ribs are extended in a direction parallel to a central axis of the flameproof enclosure, and slots matched with the ribs are formed on the outer wall of the acquisition instrument, the outer wall of the battery and the outer wall of the wireless transmitter.

A sensing-acquisition-wireless transmission integrated microseismic monitoring method is provided, including the following steps:

step 1: according to different types of known microseismic signals, establishing different types of microseismic signal databases. The microseismic signals including rock fracture signals, blasting signals, power frequency interference signals, locomotive signals or the like;

step 2: determining an STA/LTA threshold according to the established microseismic signal databases, so that the rock fracture signals in the microseismic signals reserved after processing each microseismic signal in the microseismic signal databases by an STA/LTA algorithm are rock fracture signals in more than 95% of the microseismic signal databases, wherein, in this step, the processing each microseismic signal in the microseismic signal databases by an STA/LTA algorithm comprises the following steps of: calculating each microseismic signal in the microseismic signal databases by an STA/LTA algorithm, and reserving the corresponding microseismic signal if the result of calculation is greater than or equal to the STA/LTA threshold;

step 3: calculating the duration, rising time, P-S wave arrival time difference, maximum amplitude, dominant frequency and maximum spectrum value of each type of microseismic signals, training a BP neural network according to the duration, rising time, P-S wave arrival time difference, maximum amplitude, dominant frequency and maximum spectrum value of each type of microseismic signals, and establishing a BP neural network microseismic signal identification model for identifying each type of microseismic signals;

step 4: embedding the STA/LTA algorithm, the STA/LTA threshold and the trained BP neural network microseismic signal identification model into the acquisition instrument; and step 5: acquiring microseismic signals on site in real time by the acquisition instrument, calculating, by the STA/LTA algorithm, the acquired signal transmitted in real time by the microseismic sensor, and comparing the result of calculation with the STA/LTA threshold, discarding the acquired signal if the result of calculation is smaller than the STA/LTA threshold, or otherwise identifying the acquired signal by the BP neural network microseismic signal identification model;

wherein, if the acquired signal is identified as a rock fracture signal, the rock fracture signal is written into a memory card; when the storage amount reaches a preset wireless transmitter activation threshold, the wireless transmitter is activated to transmit the rock fracture signal to an external receiving apparatus; and the wireless transmitter is turned off at the end of the transmission; and if the acquired signal is not identified as a rock fracture signal, the acquired signal is discarded.

Compared with the prior art, the present invention has the following beneficial effects.

1. By integrating the acquisition instrument, the wireless transmitter and the battery, the wired transmission of microseismic signals is changed to the wireless transmission. The arrangement position of a sensor becomes more flexible.

2. By the fixation device designed in the present invention, the expansion and contraction of expandable plates is realized by the push nut. The mounting of the device at the orifice and the recovery of the device are realized.

3. In the present invention, a new flap-type fixation device is designed, with friction teeth additionally provided on outer wings. The load bearing capacity of the device in the borehole is increased, and the coupling of the apparatus with the wall of the borehole is enhanced.

4. By the process of optimizing the acquisition and transmission system provided by the present invention, the continuous reception and intermittent transmission of microseismic signals are realized. The power consumption of the apparatus is greatly reduced and the working circle of the apparatus is prolonged.

REFERENCE NUMERALS

Figure 1:
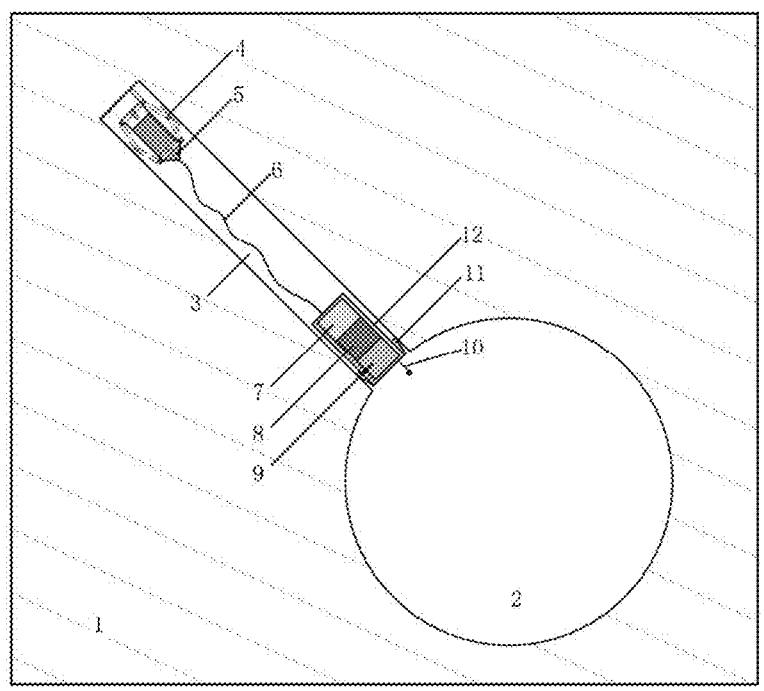
FIG. 1 is a schematic view of on-site drilling and mounting according to the present invention.
Figure 2:
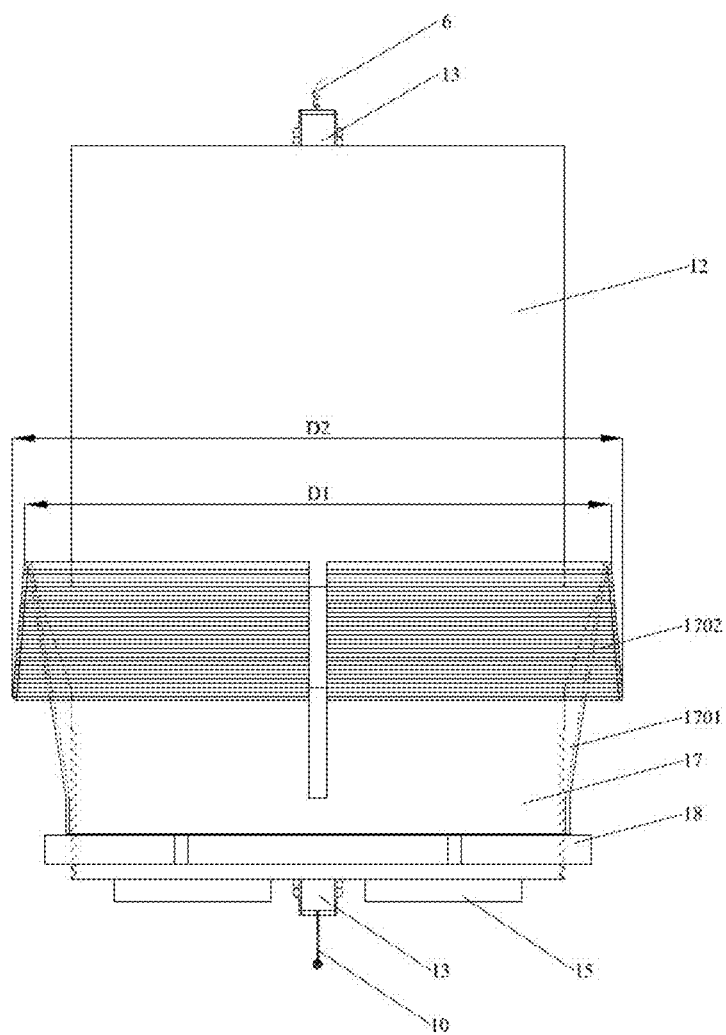
FIG. 2 is a front view of the external structure according to the present invention.
Figure 3:
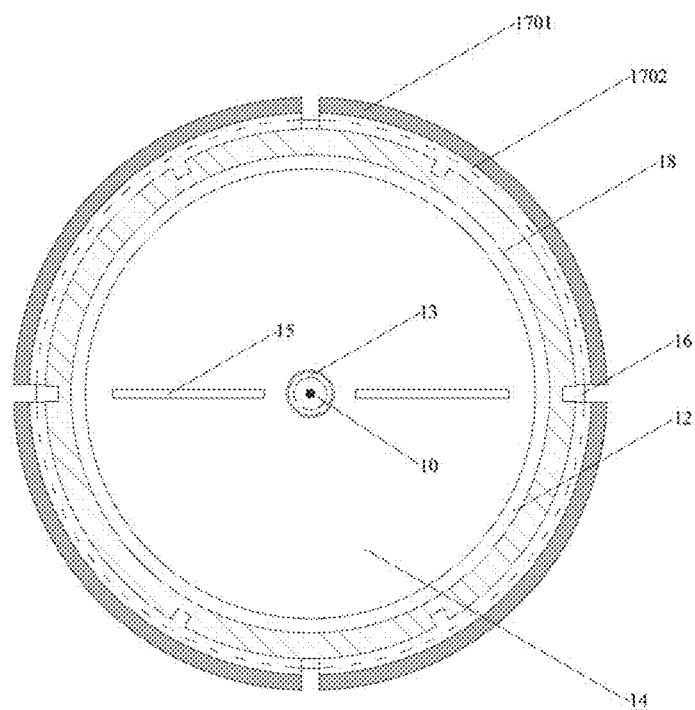
FIG. 3 is a top view of the external structure according to the present invention.

1: surrounding rock; 2: tunnel; 3: borehole; 4: sensor fixation and recovery device; 5: microseismic sensor; 6: data transmission line; 7: acquisition instrument; 8: battery; 9: wireless transmitter; 10: transmitting antenna; 11: fixation device; 12: flameproof enclosure; 13: flameproof cable gland; 14: seal cover; 15: rotary handle; 16: support stage; 17: expandable plate; 1701: expandable plate inner wing; 1702: expandable plate outer wing; 17011: connection ring; 17012: inner wing elastic plate; 18: push nut; 19: slot; 20: wire; 21: sleeve; 22: manually-operated rotary rod; 23: meshing teeth; D1: the outer diameter of the expandable plate inner wing; and, D2: the outer diameter of the expandable plate outer wing.

DETAILED DESCRIPTION OF THE PRESENT INVENTION

To make a person of ordinary skill in the art to easily understand and implement the present invention, the present invention will be further described below in detail by embodiments. It should be understood that the embodiments to be described below are merely for describing and explaining the present invention, rather than limiting the present invention.

A sensing-acquisition-wireless transmission integrated microseismic monitoring system is provided, including a sensing unit and an acquisition-wireless transmission unit. The sensing unit is connected to the acquisition-wireless transmission unit through a data transmission line 6.

The sensing unit includes a microseismic sensor 5 and a sensor fixation and recovery device 4. The microseismic sensor 5 is arranged on the bottom of a borehole 3. The borehole 3 is formed on an inner wall of a tunnel 2. The microseismic sensor 5 is fixed on the bottom of the borehole 3 through the sensor fixation and recovery device 4. The acquisition-wireless transmission unit includes a flameproof enclosure 12, an acquisition instrument 7, a battery 8, a wireless transmitter 9 and a transmitting antenna 10. The battery 8 is connected to the acquisition instrument 7 and the wireless transmitter 9, respectively. A protection and fixation portion of the acquisition-wireless transmission unit includes a fixation device 11 and a flameproof enclosure 12. The fixation device 11 includes expandable plates 17 and a push nut 18. Each expandable plate 17 includes an expandable plate inner wing 1701 and an expandable plate outer wing 1702, with friction teeth formed on the surface of the expandable plate outer wing 1702. The expandable plates 17 are supported by a support stage 16 that is connected to the flameproof enclosure 12. The flameproof enclosure 12 is sealed by a seal cover 14. The seal cover 14 can be rotated by a rotary handle 15.

The system of the present invention further includes incoming and outgoing wires, flameproof cable glands 13 with a waterproof function, slots 19 for fixing the acquisition instrument 7, the battery 18 and the wireless transmitter 9, and a recovery sleeve matched with the push nut 18. The recovery sleeve includes a sleeve 21, a manually-operated rotary rod 22 and meshing teeth 23.

In the present invention, the microseismic sensor 5 is coupled with the sensor fixation and recovery device 4 and fixed on the bottom of the borehole 3 that is inclined upward or inclined downward. The mounting and recovery of the microseismic sensor 5 can be realized by a mounting and recovery rod matched with the sensor fixation and recovery device 4. The microseismic sensor 5 can receive vibration signals from the outside and transmit the signals to the acquisition instrument 7 of the acquisition-wireless transmission unit through the data transmission line 6.

The flameproof enclosure 12 is a cylindrical barrel. The borehole 3 is formed on the inner wall of the tunnel 2, and the microseismic sensor 5 is arranged on the bottom of the borehole 3 and fixed by the sensor fixation and recovery device 4. The flameproof enclosure 12 is arranged at an orifice of the borehole 3. An end of the flameproof enclosure 12 facing the bottom of the borehole 3 is a closed end and provided with a flameproof cable gland 13, while an end of the flameproof enclosure 12 facing the tunnel 2 is an open end. A seal cover 14 is hermetically arranged at the open end, and a flameproof cable gland 13 is arranged on the seal cover 14. The flameproof cable gland 13 arranged at the closed end of the flameproof enclosure 12 is connected to the microseismic sensor 5 through the data transmission line 6, and the flameproof cable gland 13 arranged on the seal cover 14 is connected to the transmitting antenna 10. Open end internal threads are formed at the open end of the flameproof enclosure 12, and external threads matched with the open end internal threads of the flameproof enclosure 12 are formed on the seal cover 14. The seal cover 14 and the open end of the flameproof enclosure 12 are sealed by the internal and external threads matched with each other. The rotary handle 15 is arranged on the seal cover 14, so that a sufficient force can be transferred during sealing.

Figure 4:
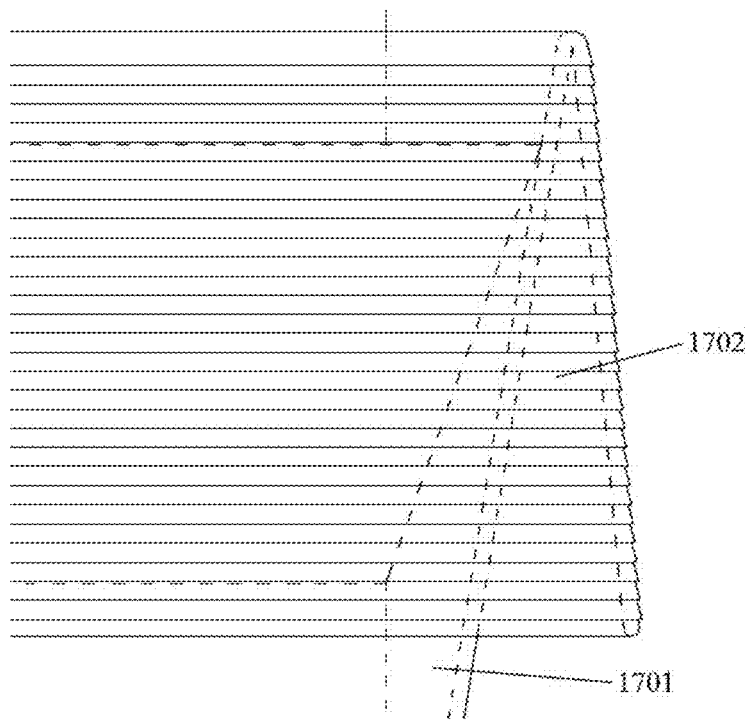
FIG. 4 is an enlarged view of the friction tooth structure on the expandable plate outer wings according to the present invention.
Figure 5:
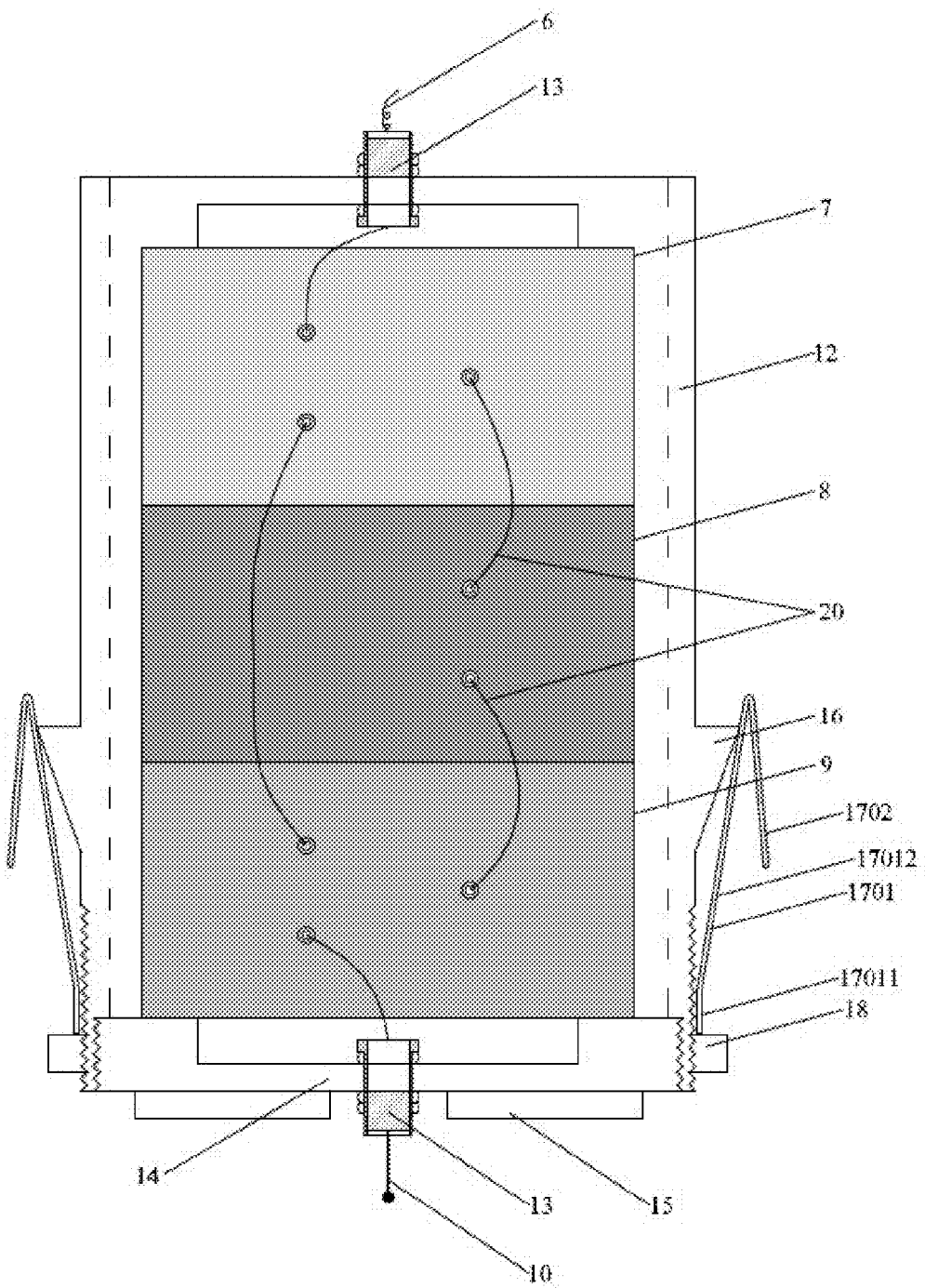
FIG. 5 is a front view of the cross section of the internal structure according to the present invention.
Figure 6:
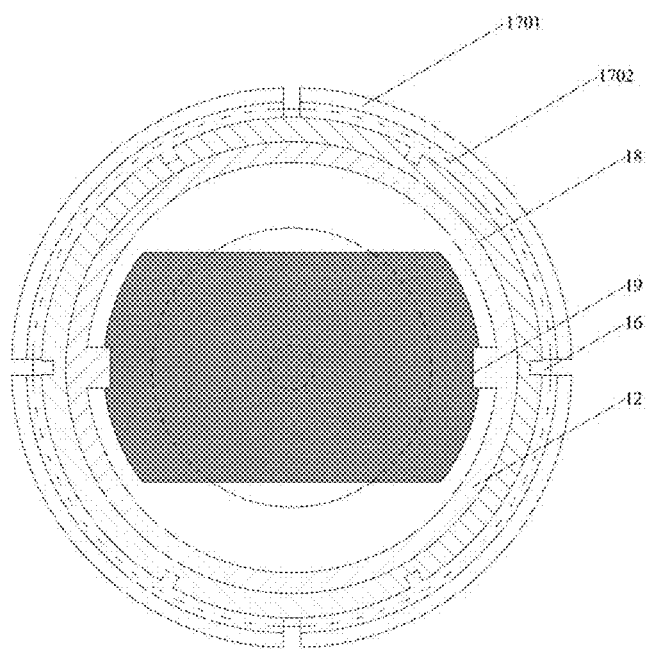
FIG. 6 is a top view of the cross section of the internal structure according to the present invention.

Open end external threads are further formed at the open end of the flameproof enclosure 12. The push nut 18 is sheathed on the open end external threads through threads. The support stage 16 is sheathed on a portion of the outer wall of the flameproof enclosure 12 between the open end external threads and the closed end. The support stage 16 is overall annular, and the support stage 16 has a triangular cross-section. The support stage 16 supports the expandable plates 17 of the fixation device. Each expandable plate 17 includes an expandable plate inner wing 1701 and an expandable plate outer wing 1702. The expandable plate inner wing 1701 includes a connection ring 17011 sheathed on the open end of the flameproof enclosure 12. The connection ring 17011 is slightly greater than the outer diameter of the open end external threads. Multiple inner wing elastic plates 17012 are circumferentially arranged on the connection ring 17011. The diameter of a circle containing a joint of each inner wing elastic plate 17012 with the connection ring 17011 is smaller than the outer diameter of the support stage 16. All the inner wing elastic plates 17012 are resisted against the support stage 16, and the inner wing elastic plates 17012 are connected to the corresponding expandable plate outer wings 1702 expanding outward. The inner wing elastic plates 17012 and the corresponding expandable plate outer wings 1702 are arranged at an angle. Friction teeth are formed on outer sides of the expandable plate outer wings 1702, as shown in FIG. 4. The friction teeth facilitate the pushing into the borehole and increase the friction with the wall of the borehole.

Figure 7:
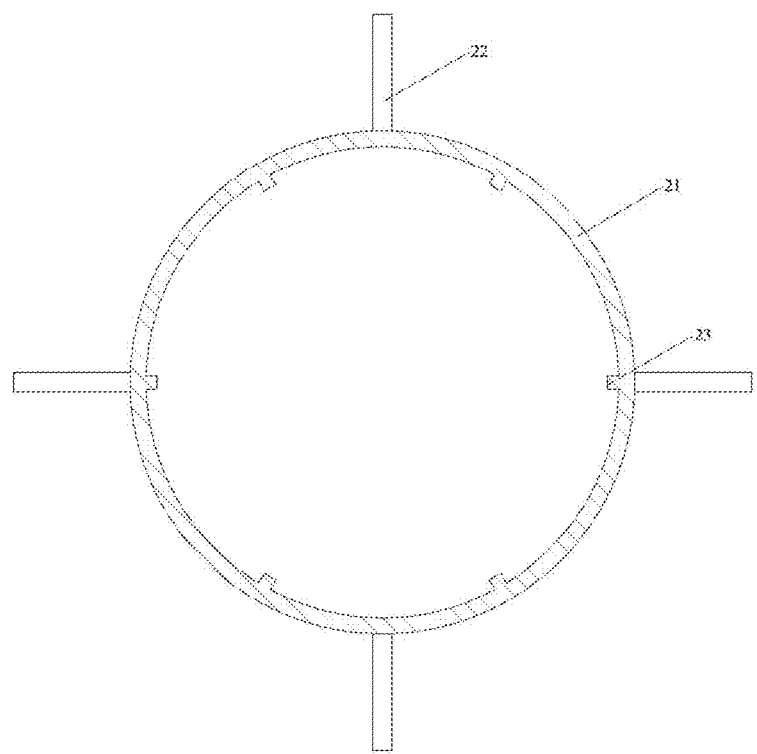
FIG. 7 is a top view of the recovery sleeve according to the present invention.
Figure 8:
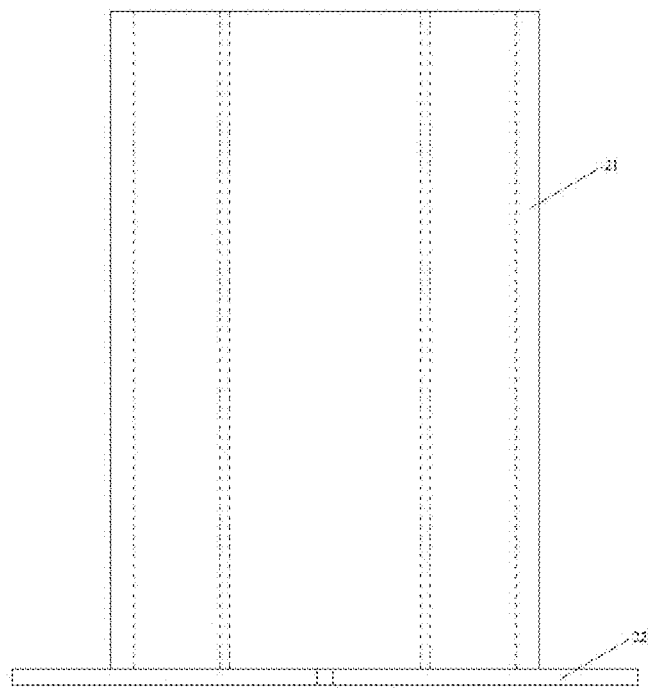
FIG. 8 is a front view of the recovery sleeve according to the present invention.

In an initial state, the inner wing elastic plates 17012 are expanded outward at a small angle, and the outer diameter D2 of the expandable plate outer wings 1702 is slightly smaller than the diameter of the borehole 3. When the connection ring 17011 is spirally pushed into the borehole 3 by the push nut 18, the inner wing elastic plates 17012 are driven to move toward the closed end of the flameproof enclosure 12 along the outer wall of the flameproof enclosure 12. Under the support to the inner wing elastic plates 17012 by the support stage 16, the inner wing elastic plates 17012 are expanded, so that the outer diameter of the expandable plate outer wings 1702 is increased, and the outer sides of the expandable plate outer wings 1702 are fitted with the wall of the external borehole 3. Grooves are prefabricated on the surface of the push nut 18, the recovery sleeve shown in FIGS. 7 and 8 is matched with the push nut 18, and meshing teeth 23 matched with the grooves are formed in the recovery sleeve. When it is infeasible to manually rotate the push nut 18, the recovery sleeve can be meshed with the push nut, and the push nut 18 is rotatably pushed by the manually-operated rotary rod.

Ribs are arranged on the inner wall of the flameproof enclosure 12, the ribs are extended in a direction parallel to a central axis of the flameproof enclosure 12, and slots 19 matched with the ribs are formed on the outer wall of the acquisition instrument 7, the outer wall of the battery 8 and the outer wall of the wireless transmitter 9. Under the circumferential limiting effect of the ribs and the slots 19, the acquisition instrument 7, the battery 8 and the wireless transmitter 9 can move within the flameproof enclosure 12 along the central axis of the flameproof enclosure 12.

In the acquisition-wireless transmission unit, the battery 8 supplies power to the acquisition instrument 7 and the wireless transmitter 9 through a wire 20. The data transmission line 6 is connected to the acquisition instrument 7 through the flameproof cable gland 13; the acquisition instrument 7 processes the received signals and then transmits them to the wireless transmitter 9 through the data transmission line; the wireless transmitter 9 is externally connected to the transmitting antenna 10 to gain the transmitted signals, and finally transmits the signals to an external receiving and processing apparatus.

Figure 9:
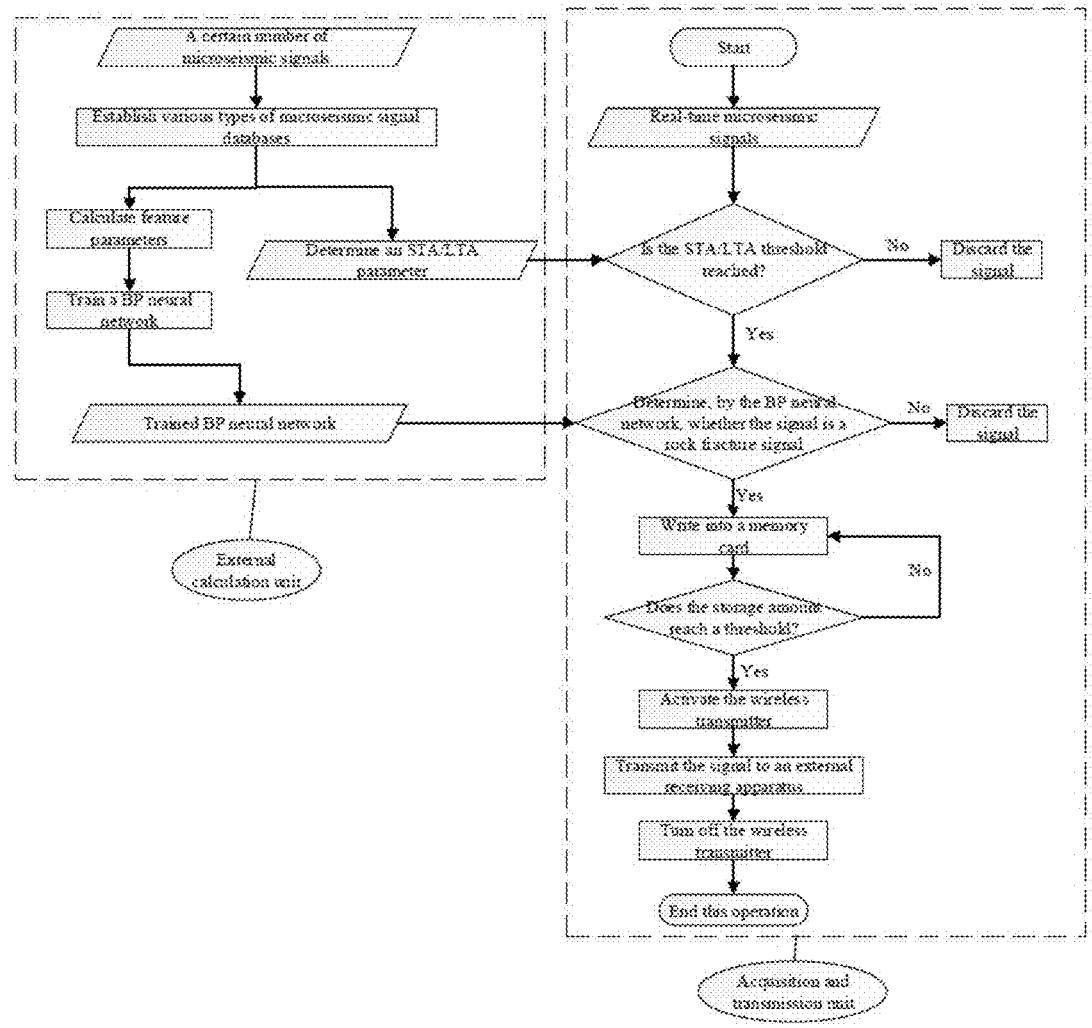
FIG. 9 is a flowchart of the algorithm for the acquisition instrument according to the present invention.

In the present invention, an STA/LTA algorithm and a trained BP neural network model are preset in the acquisition instrument 7 to realize the real-time acquisition, identification and transmission of microseismic signals. The specific steps will be described as follows. The flowchart is shown in FIG. 9.

Step 1: Different types of microseismic signal databases are established according to different types of known microseismic signals. The microseismic signals include rock fracture signals, blasting signals, power frequency interference signals, locomotive signals or the like, wherein the rock fracture signals are valid microseismic signals.

Step 2: An STA/LTA threshold is determined according to the established microseismic signal databases, so that the rock fracture signals in the microseismic signals reserved after processing each microseismic signal in the microseismic signal databases by an STA/LTA algorithm are rock fracture signals in more than 95% of the microseismic signal databases.

In this step, processing each microseismic signal in the microseismic signal databases by an STA/LTA algorithm includes the following steps of: calculating each microseismic signal in the microseismic signal databases by an STA/LTA algorithm, and reserving the corresponding microseismic signal if the result of calculation is greater than or equal to the STA/LTA threshold.

Step 3: Feature parameters such as the duration, rising time, P-S wave arrival time difference, maximum amplitude, dominant frequency and maximum spectrum value of each type of microseismic signals are calculated, a BP neural network is trained according to the duration, rising time, P-S wave arrival time difference, maximum amplitude, dominant frequency and maximum spectrum value of each type of microseismic signals, and a BP neural network microseismic signal identification model for identifying each type of microseismic signals is established.

Step 4: The STA/LTA algorithm, the STA/LTA threshold and the trained BP neural network microseismic signal identification model are embedded into the acquisition instrument 7. The STA/LTA threshold and the related parameters of the BP neural network microseismic signal identification model can be modified later, and a wireless transmitter activation threshold is set.

Step 5: Microseismic signals are acquired on site in real time by the acquisition instrument 7, the acquired signal transmitted in real time by the microseismic sensor 5 is calculated by the STA/LTA algorithm, and the result of calculation is compared with the STA/LTA threshold.

If the result of calculation is smaller than the STA/LTA threshold, the acquired signal is discarded; or otherwise, the acquired signal is identified by the BP neural network microseismic signal identification model.

If the acquired signal is identified as a rock fracture signal, the rock fracture signal is written into a memory card. When the storage amount reaches the preset wireless transmitter activation threshold, the wireless transmitter is activated to transmit the rock fracture signal to an external receiving apparatus. The wireless transmitter is turned off at the end of the transmission.

If the acquired signal is not identified as a rock fracture signal, the acquired signal is discarded.

The process of mounting and recovering the device of the present invention will be described below.

Step 1: The microseismic sensor 5 is connected to the sensor fixation and recovery device 4, and fixed on the bottom of the borehole 3 by the mounting and recovery rod.

Step 2: The output end of the microseismic sensor 5 is connected to one end of the data transmission line 6, while the other end of the data transmission line 6 is connected to the acquisition instrument 7 through the flameproof cable gland 13; and then, the battery 8 is successively connected to the acquisition instrument 7 and the wireless transmitter 9, the acquisition instrument 7 is connected to the wireless transmitter 9, and the wireless transmitter 9 is connected to the transmitting antenna 10 through the flameproof cable gland 13.

Step 3: The slots 19 on the acquisition instrument 7, the battery 8 and the wireless transmitter 9 are aligned with the ribs on the inner wall of the flameproof enclosure 12, and the acquisition instrument 7, the battery 8 and the wireless transmitter 9 are pushed into and arranged in the flameproof enclosure 12.

Step 4: The flameproof cable gland 13 at the closed end of the flameproof enclosure 12 is tightened, the flameproof cable gland 13 on the seal cover 14 is tightened, and the seal cover 14 is tightened at the open end of the flameproof enclosure 12 by the rotary handle 15 to realize sealing.

Step 5: The flameproof enclosure 12 is arranged at the orifice of the borehole 3.

Step 6: The push nut 18 is spirally pushed inward (the push nut 18 can be spirally pushed inward by the recovery sleeve), so that the inner wing elastic plates 17012 are expanded outward; and the expandable plate outer wings 1702 are driven to expand outward, so that the friction teeth on the outer sides of the expandable plate outer wings 1702 are closely resisted against the inner wall of the borehole 3. Then, the mounting of the system is completed.

Step 7: At the end of monitoring, the recovery sleeve with a certain length shown in FIGS. 7 and 8 is inserted into the borehole. After several tries, the recovery sleeve is completely meshed with the push nut 18. The push nut 18 is reversely screwed by the manually-operated rotary rod 22 on the recovery sleeve. Then, the inner wing elastic plates 17012 are contracted, the expandable plate outer wings 1702 are driven to contract, and the friction between the outer sides of the expandable plate outer wings 1702 and the inner wall of the borehole 3 is reduced. When the friction is low enough or when the outer diameter of the expandable plate outer wings 1702 is smaller than the inner diameter of the borehole 3, the flameproof enclosure 12 can be taken out of the borehole 3 by a slight external force.

Step 8: The flameproof cable gland 13 at the closed end of the flameproof enclosure 12 is separated from the data transmission line 6.

Step 9: The microseismic sensor 5 is recovered by the mounting and recovery rod. The recovery is completed.

The specific implementations described herein are merely for explaining the spirit of the present invention. Those skilled in the art to which the present invention belongs can make various modifications or supplementations to the described specific implementations, or replace the described specific implementations in a similar way, without departing the spirit of the present invention or the scope defined by the appended claims.

What is claimed is:

1. A sensing-acquisition-wireless transmission integrated microseismic monitoring system, comprising a sensing unit, wherein the system further comprises an acquisition-wireless transmission unit;

the sensing unit comprises a microseismic sensor (5) which is arranged on the bottom of a borehole (3) formed on an inner wall of a tunnel (2);

the acquisition-wireless transmission unit comprises a flameproof enclosure (12), an acquisition instrument (7), a battery (8), a wireless transmitter (9) and a transmitting antenna (10), the battery (8) being connected to the acquisition instrument (7) and the wireless transmitter (9), respectively;

the acquisition instrument (7), the battery (8) and the wireless transmitter (9) are all arranged in the flameproof enclosure (12);

the flameproof enclosure (12) is a cylindrical barrel arranged at an orifice of the borehole (3); an end of the flameproof enclosure (12) facing the bottom of the borehole (3) is a closed end and provided with a flameproof cable gland (13), while an end of the flameproof enclosure (12) facing the tunnel (2) is an open end; a seal cover (14) is hermetically arranged at the open end; a flameproof cable gland (13) is arranged on the seal cover (14); the acquisition instrument (7) is connected to an end of a data transmission line (6) through the flameproof cable gland (13) arranged at the closed end of the flameproof enclosure (12), while the other end of the data transmission line (6) is connected to the microseismic sensor (5); and the wireless transmitter (9) is connected to the transmitting antenna (10) through the flameproof cable gland (13) arranged on the seal cover (14); and open end external threads are formed at the open end of the flameproof enclosure (12); a push nut (18) is sheathed on the open end external threads through threads; a support stage (16) is sheathed on a portion of an outer wall of the flameproof enclosure (12) between the open end external threads and the closed end; a connection ring (17011) is movably sheathed on the open end of the flameproof enclosure (12); the push nut (18) is connected to the connection ring (17011); multiple inner wing elastic plates (17012) are circumferentially arranged on the connection ring (17011); the inner wing elastic plates (17012) are connected to corresponding expandable plate outer rings (1702), respectively; friction teeth are provided on outer sides of the expandable plate outer wings (1702); and the diameter of a circle containing a joint of each inner wing elastic plate (17012) with the connection ring (17011) is smaller than the outer diameter of the support stage (16).

2. The sensing-acquisition-wireless transmission integrated microseismic monitoring system according to claim 1, wherein open end internal threads are formed at the open end of the flameproof enclosure (12), and external threads matched with the open end internal threads of the flameproof enclosure (12) are formed on the seal cover (14).

3. The sensing-acquisition-wireless transmission integrated microseismic monitoring system according to claim 1, wherein the support stage (16) is overall annular, and the support stage (16) has a triangular cross-section.

4. The sensing-acquisition-wireless transmission integrated microseismic monitoring system according to claim 1, wherein ribs are arranged on an inner wall of the flameproof enclosure (12), the ribs are extended in a direction parallel to a central axis of the flameproof enclosure (12), and slots (19) matched with the ribs are formed on an outer wall of the acquisition instrument (7), an outer wall of the battery (8) and an outer wall of the wireless transmitter (9).

* * * * *